US008638071B2

(12) United States Patent
Mizuno et al.

(10) Patent No.: US 8,638,071 B2
(45) Date of Patent: Jan. 28, 2014

(54) ELECTRONIC DEVICE, CONTROL METHOD AND PROGRAM

(75) Inventors: Masayoshi Mizuno, Tokyo (JP);
Shunsuke Kunieda, Tokyo (JP);
Shigeru Enomoto, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 487 days.

(21) Appl. No.: 12/595,254

(22) PCT Filed: Apr. 22, 2008

(86) PCT No.: PCT/JP2008/058228
§ 371 (c)(1),
(2), (4) Date: Oct. 9, 2009

(87) PCT Pub. No.: WO2008/133336
PCT Pub. Date: Nov. 6, 2008

(65) Prior Publication Data
US 2010/0045243 A1  Feb. 25, 2010

(30) Foreign Application Priority Data
Apr. 23, 2007 (JP) ................................ 2007-112933

(51) Int. Cl.
*H02J 7/04* (2006.01)
*H02J 7/16* (2006.01)

(52) U.S. Cl.
USPC ........................................................ 320/162

(58) Field of Classification Search
USPC .................. 320/103, 112–114, 162
See application file for complete search history.

(56) References Cited

U.S. PATENT DOCUMENTS

| 4,061,956 A * | 12/1977 | Brown et al. ................. 320/153 |
| 5,666,039 A * | 9/1997 | Odaohara et al. ............. 320/152 |
| 6,774,604 B2 * | 8/2004 | Matsuda et al. ............... 320/110 |
| 2004/0145342 A1 * | 7/2004 | Lyon ............................. 320/108 |
| 2006/0035527 A1 | 2/2006 | Numano |

(Continued)

FOREIGN PATENT DOCUMENTS

| CN | 1462923 A | 12/2003 |
| JP | 2000 112579 | 4/2000 |

(Continued)

OTHER PUBLICATIONS

Office Action issued Oct. 30, 2012 in Japanese Patent Application No. 2009-511921.

(Continued)

*Primary Examiner* — Samuel Berhanu
(74) *Attorney, Agent, or Firm* — Oblon, Spivak, McClelland, Maier & Neustadt, L.L.P.

(57) ABSTRACT

Reduction of wasteful power consumption is envisaged. A power supply function-equipped electronic apparatus (10) is configured to be capable of supplying power to a battery device (20) incorporating a battery (21) by use of a cable (30) connecting the apparatus (10) with the device (20). A detection section (13) detects whether charging of the battery (21) incorporated in the battery device (20) is complete through the cable (30). When charging of the battery (21) is detected to be complete, a power control section (12) turns off power of the power supply function-equipped electronic apparatus (10). This invention can be applied illustratively to gaming machines and the like each composed of a gaming machine body and its controller.

8 Claims, 9 Drawing Sheets

(56) References Cited

U.S. PATENT DOCUMENTS

| | | |
|---|---|---|
| 2007/0067659 A1 | 3/2007 | Tevanian, Jr. |
| 2007/0188139 A1* | 8/2007 | Hussain et al. ............... 320/128 |
| 2008/0313477 A1 | 12/2008 | Numano |
| 2009/0144575 A1 | 6/2009 | Tevanian, Jr. |
| 2012/0066529 A1 | 3/2012 | Numano |

FOREIGN PATENT DOCUMENTS

| | | |
|---|---|---|
| JP | 2000-112579 A | 4/2000 |
| JP | 2001-242965 | 9/2001 |
| JP | 2002-25629 | 1/2002 |
| JP | 2004 234186 | 8/2004 |
| JP | 2004-234186 A | 8/2004 |

OTHER PUBLICATIONS

Communication pursuant to Article 94(3) EPC issued Apr. 15, 2013 in European Patent Application No. 08 752 235.5.

Communication issued May 14, 2013 in European Patent Application No. 08752235.5.

Supplementary Search Report issued Mar. 21, 2013 in European Patent Application No. 08752235.5.

* cited by examiner

F I G . 1
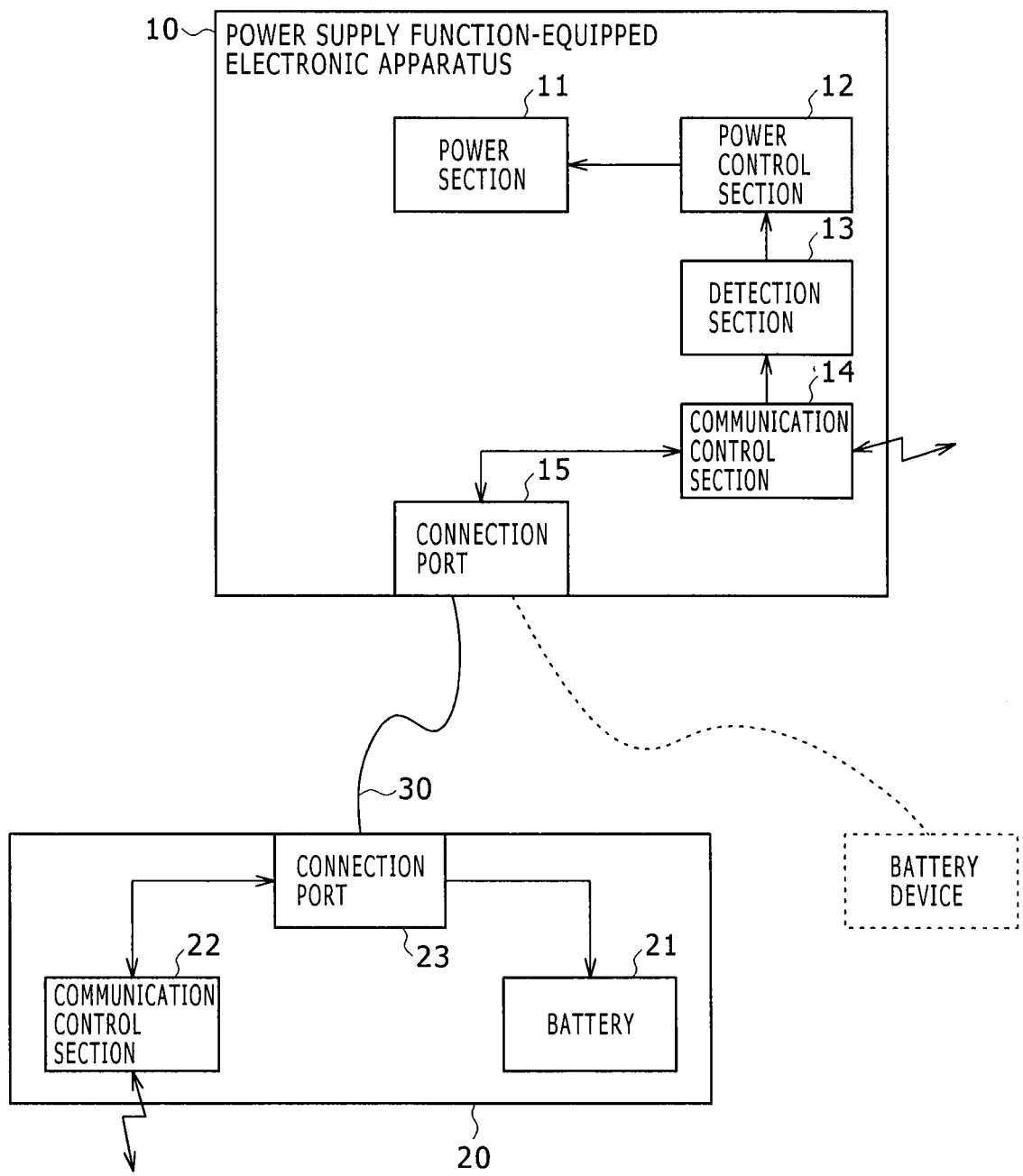

FIG. 5
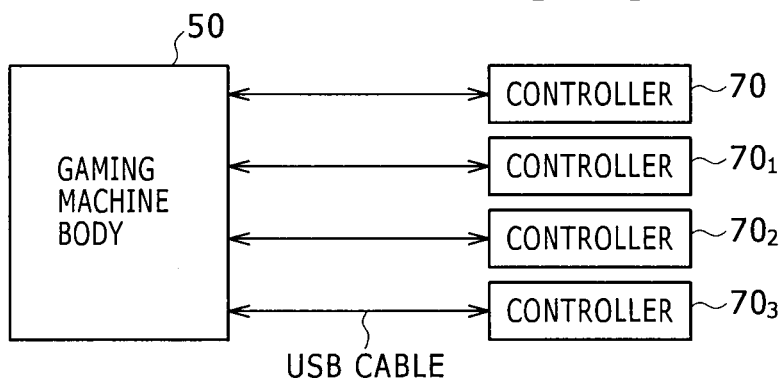
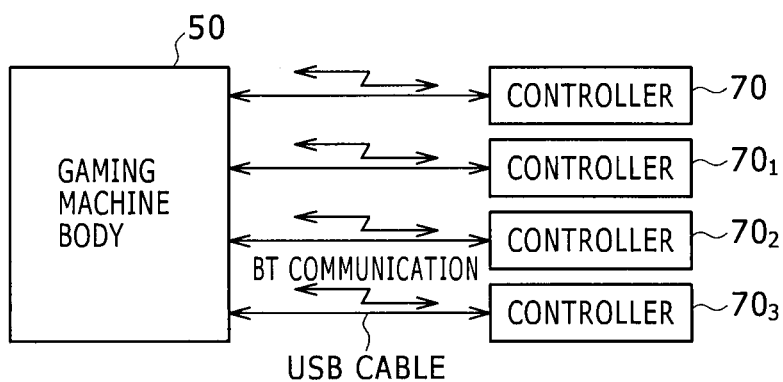
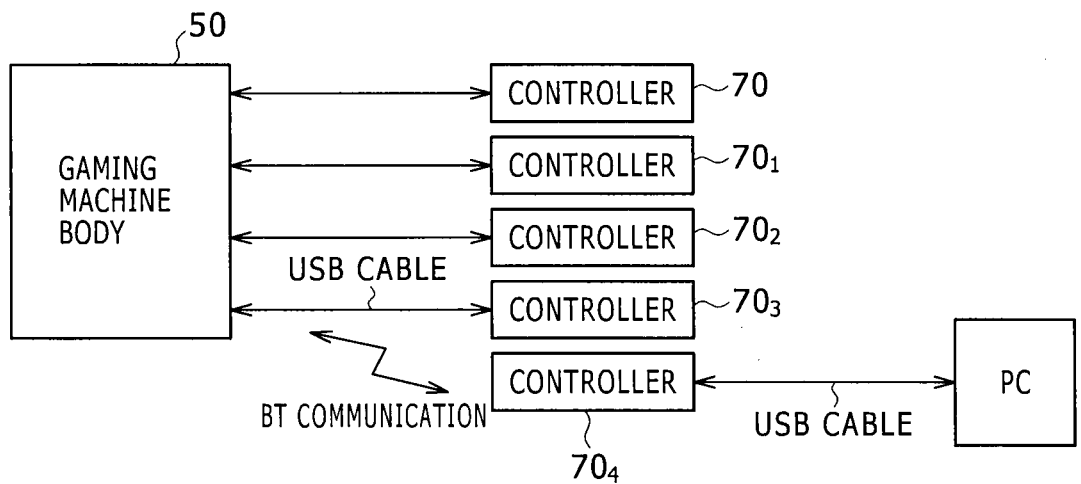

FIG. 6

MENU SCREEN

- TURN OFF POWER OF THE MACHINE BODY
- TURN OFF POWER OF THIS CONTROLLER
- TURN OFF POWER WHEN CHARGING OF THIS CONTROLLER IS COMPLETE
- TURN OFF POWER WHEN CHARGING OF ALL CONTROLLERS IS COMPLETE

CHARGING STATUS SCREEN

- CONTROLLER #1 IS BEING CHARGED (75%)
- CONTROLLER #2 IS FULLY CHARGED (100%)
- CONTROLLER #3 IS BEING CHARGED (40%)
- CONTROLLER #4 IS BEING CHARGED (20%)

CHARGING STATUS SCREEN

- CONTROLLER #1 IS BEING CHARGED (75%)

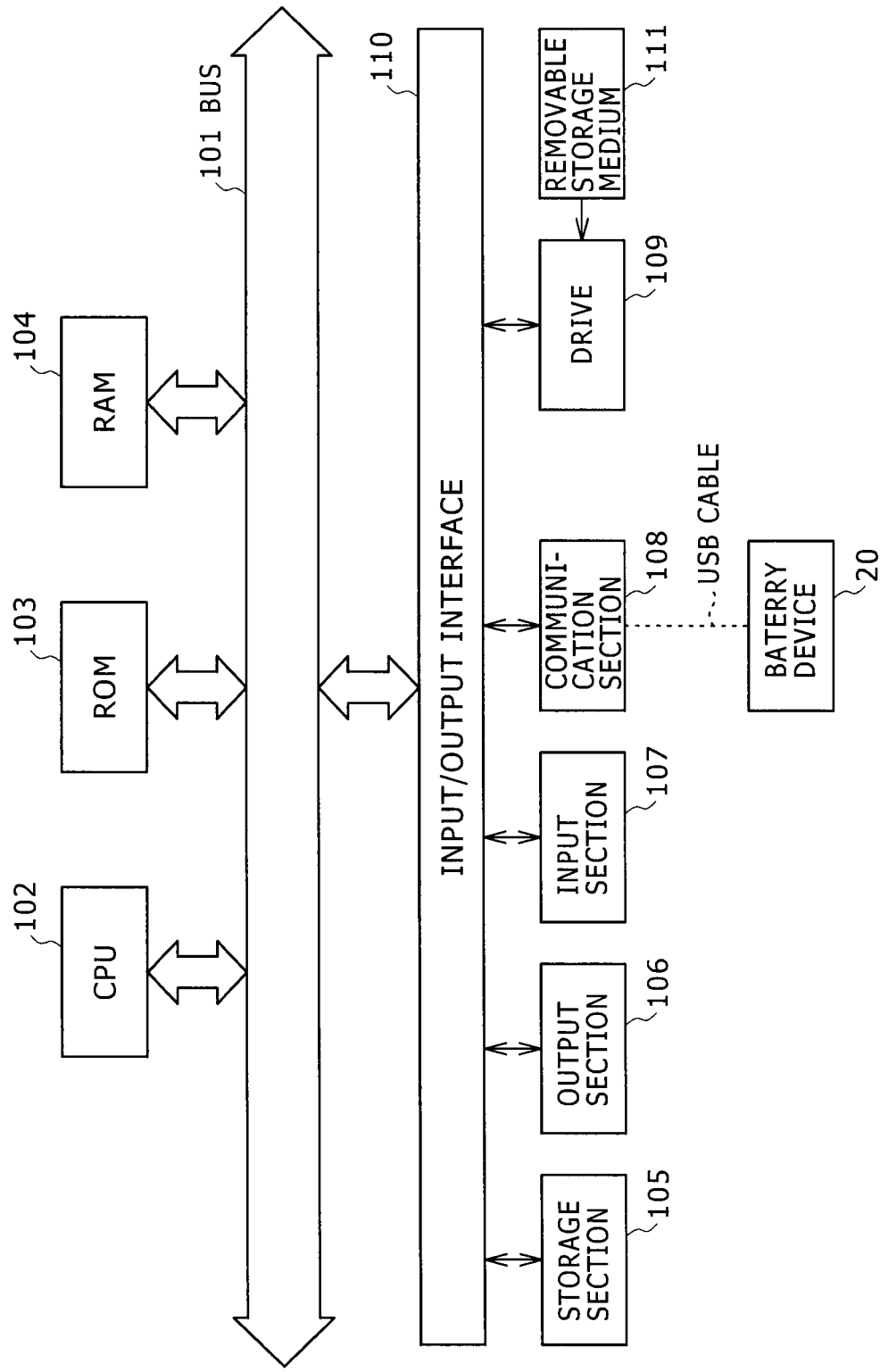

ELECTRONIC DEVICE, CONTROL METHOD AND PROGRAM

TECHNICAL FIELD

The present invention relates to an electronic apparatus, a control method, and a program. More particularly, the invention relates to an electronic apparatus, a control method and a program, whereby the electronic apparatus connected via a cable to a device incorporating a battery in a manner capable of supplying power to the device through the cable can reduce wasteful power consumption.

BACKGROUND ART

For example, where traditional gaming machines were connected by wired communication with their controllers, users were required to play games within a distance ranging from each machine proper to its wired controller.

Today, there exist gaming machines connected wirelessly (i.e., by wireless communication) with their controllers. Also, techniques have been proposed whereby the time required to establish a communication link between a gaming machine body and its controller is shortened (e.g., see Patent Document 1).

Meanwhile, where the gaming machine body is connected to its controller via a cable, with communication performed therebetween through that cable (i.e., by wired communication), the gaming machine body can supply power to the controller via the cable as well.

However, where the gaming machine body communicates wirelessly with its controller, it is difficult for the gaming machine to supply power to the controller from the gaming machine body. Illustratively, this requires the controller to incorporate a battery serving as its own power supply.

Where the controller incorporates the battery, the battery needs to be recharged when its remaining level has dropped. One way to charge the battery in the controller is illustratively to have the gaming machine body furnished with a function to supply power to an external device so that the gaming machine body connected to its controller via a cable may supply power to the controller through the cable and get the internal battery charged thereby.

Here, one way for the gaming machine body to supply power to an external device is illustratively to utilize communication pursuant to the USB (Universal Serial Bus) standard (USB communication).

The USB supports bus-powered operation, allowing a device (USB device) (target) connected to a host to be powered by the USB device.

Thus the gaming machine body is configured as a host for USB communication, furnished with a USB communication port (USB port (terminal)) in the gaming machine body, and the controller is configured as a USB device with a USB port in the controller. This enables the gaming machine body to charge the battery of the controller.

Specifically, the USB port of the gaming machine body is connected to the USB port of the controller using a USB communication cable (USB cable) so that the gaming machine body may supply power to the controller via the USB cable in USB bus-powered operation. This allows the battery of the controller to be charged.

As described, where the gaming machine body communicating wirelessly with its controller is capable of supplying power, games can be played while the USB cable is being detached from the gaming machine body or from the controller. And the battery of the controller can be charged by connecting the gaming machine body with the controller using a USB cable illustratively while games are not being played.

Meanwhile, some gaming machine bodies capable of feeding power through the USB cable might be configured to supply power only while the machine body is turned on. This type of gaming machine body is configured to stop feeding power (i.e., incapable of supplying power) while the machine is turned off.

In this case, as long as the gaming machine body is turned off, its controller cannot be charged. It follows that, in order to charge the controller, the gaming machine body needs to be switched on even if no games are being played.

Patent Document 1: Japanese Patent Laid-Open No. 2004-336740

As described above, in order to charge the controller, it is necessary to keep the gaming machine body turned on. For this reason, even after charging of the controller has been complete, the gaming machine body remains switched on until the user turns off the machine.

As a result, power is wasted on the gaming machine body.

DISCLOSURE OF INVENTION

The present invention has been made under the above circumstances and provides arrangements for connecting a device incorporating a battery to an electronic apparatus via a cable in such a manner that the apparatus can supply power through the cable to the device without wasteful power dissipation.

According to one aspect of the present invention, there is provided an electronic apparatus connected to a device incorporating a battery via a cable in a manner capable of supplying power to said device through said cable, or a program for causing a computer to function as an electronic apparatus, said electronic apparatus including: detection means for detecting whether charging of the battery incorporated in said device is complete through said cable; and power control means for turning off power of said electronic apparatus when charging of said battery is detected to be complete.

According to one aspect of the present invention, there is provided a control method for controlling an electronic apparatus connected to a device incorporating a battery via a cable in a manner capable of supplying power to said device through said cable, said control method including the steps of: detecting whether charging of the battery incorporated in said device is complete through said cable; and turning off power of said electronic apparatus when charging of said battery is detected to be complete.

According to one aspect of the present invention, as outlined above, whether charging of the battery incorporated in said device is complete through said cable is detected. When charging of said battery is detected to be complete, the power of said electronic apparatus is turned off.

Wasteful power consumption can thus be reduced according to one aspect of the present invention.

BRIEF DESCRIPTION OF DRAWINGS

FIG. 1 is a block diagram showing a typical configuration of a charging system to which the present invention is applied.

FIG. 5 is a view explanatory of the processing of a gaming machine body 50 as it charges a plurality of controllers simultaneously.

FIG. 6 is a view illustratively showing a menu screen, a first changing screen, and a second charging screen.

FIG. 9 is a block diagram showing a typical structure of a computer to which the present invention is applied.

BEST MODES FOR CARRYING OUT THE INVENTION

Figure 2:
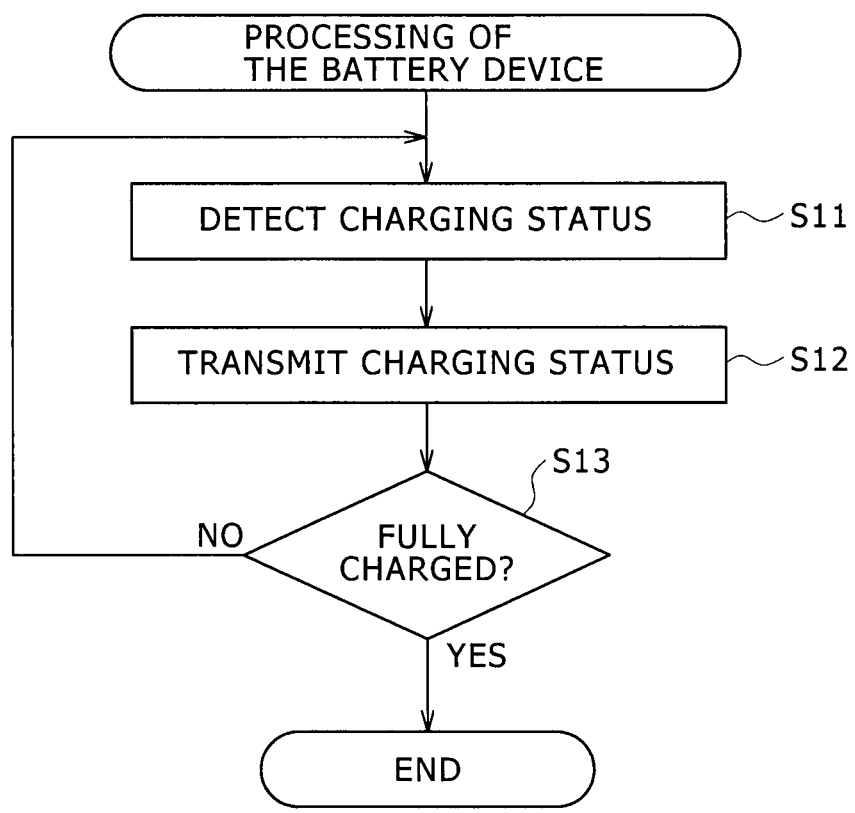
FIG. 2 is a flowchart explanatory of the processing of a battery device 20.

Explained below are some preferred embodiments of the present invention, with the constituent features of the invention being shown in correspondence to what is described in this specification or in the accompanying drawings illustratively as follows: the description is intended to ascertain that the preferred embodiments supporting the present invention are found in the specification or in the drawings. Thus if there is an embodiment which corresponds to one of the constituent features of the present invention but which is not described hereunder, this does not mean that the embodiment in question does not correspond to that constituent feature. Conversely, if an embodiment of this invention is described hereunder as corresponding to one of the constituent features of the invention, this does not mean that the embodiment in question does not correspond to all other constituent features of the present invention.

The electronic apparatus according to one aspect of the present invention is configured as:

an electronic apparatus (e.g., power supply function-equipped electronic apparatus 10 in FIG. 1) connected to a device (e.g., battery device 20 in FIG. 1) incorporating a battery via a cable in a manner capable of supplying power to said device through said cable, or a program for causing a computer to function as an electronic apparatus, said electronic apparatus including:

detection means (e.g., detection section 13 in FIG. 1) for detecting whether charging of the battery incorporated in said device is complete through said cable; and power control means (e.g., power control section 12 in FIG. 1) for turning off power of said electronic apparatus when charging of said battery is detected to be complete.

The electronic apparatus according to one aspect of the present invention may further include:

a display control means (e.g., display control section 57 in FIG. 4) for causing display means displaying pictures to display a menu screen prompting a user to select whether to turn off said power when charging of the battery incorporated in one particular device out of a plurality of devices is complete, or when charging of the batteries incorporated in all of said devices is complete;

wherein, if said power is selected to be turned off when charging of the battery in said one particular device is complete, then said power control means may turn off said power when charging of the battery in said one particular device is detected to be complete; and wherein, if said power is selected to be turned off when charging of the batteries incorporated in all of said devices is complete, then said power control means may turn off said power when charging of the batteries incorporated in all of said devices is detected to be complete.

The electronic apparatus according to one aspect of the present invention may further include:

wired communication control means (e.g., south bridge 54 in FIG. 4) for conducting wired communication with said device via said cable;

wherein said detection means may detect whether charging of the battery incorporated in said device is complete on the basis of information indicating status of said device and acquired through said wired communication.

The electronic apparatus according to one aspect of the present invention may further include:

wireless communication control means (e.g., BT chip 53 in FIG. 4) for conducting wireless communication with said device;

wherein said detection means may detect whether charging of the battery incorporated in said device is complete on the basis of information indicating status of said device and acquired through said wireless communication.

The control method according to one aspect of the present invention involves controlling an electronic apparatus (e.g., power supply function-equipped electronic apparatus 10 in FIG. 1) connected to a device (e.g., battery device 20 in FIG. 1) incorporating a battery via a cable in a manner capable of supplying power to said device through said cable, said control method including the steps of:

detecting (e.g., in step S22 of FIG. 3) whether charging of the battery incorporated in said device is complete through said cable; and turning off (e.g., in step S23 of FIG. 3) power of said electronic apparatus when charging of said battery is detected to be complete.

The preferred embodiments of the present invention will now be explained below in reference to the accompanying drawings.

FIG. 1 shows a typical configuration of a charging system (in this specification, the term "system" refers to a logical configuration of a plurality of component devices; each of the devices may or may not be housed in a single enclosure) to which the present invention is applied.

In FIG. 1, the charging system is made up of a power supply function-equipped electronic apparatus 10 and a battery device 20. The power supply function-equipped electronic apparatus 10 and the battery device 20 are connected by a cable 30 (forming a wired connection).

Illustratively, the power supply function-equipped electronic apparatus 10 may be a gaming machine body, a PC (Personal Computer), AV (Audio Visual) equipment (e.g., TV (Television) receiver, HD (Hard Disk) recorder, etc.), or a household electrical appliance (e.g., refrigerator). The electronic apparatus 10 has the power supply function to supply power to an external device.

Specifically, the power supply function-equipped electronic apparatus 10 includes a power section 11, a power control section 12, a detection section 13, a communication control section 14, and a connection port 15 and the like.

The power section 11 converts AC (Alternating Current) power (voltage, current) from a wall outlet, not shown, into power for driving the respective blocks of the power supply function-equipped electronic apparatus 10, the converted power being supplied to the necessary blocks.

The power control section 12 controls the power section 11 in accordance with information from the detection section 13 or in keeping with the operations on a power button, not shown, so as to turn on or off power of the power supply function-equipped electronic apparatus 10. That is, by controlling the power section 11, the power control section 12 controls the supply of power to the respective blocks of the power supply function-equipped electronic apparatus 10.

The detection section 13 detects whether charging of a battery 21 incorporated in the battery device 20 connected to the power supply function-equipped electronic apparatus 10 via the cable 30 is complete on the basis of the information coming from the communication control section 14. Information denoting full charge of the battery 21 is fed to the power control section 12.

The communication control section 14 controls wired communication conducted through the connection port 15.

Specifically, the communication control section 14 transmits the information destined for the battery device 20 and others through the connection port 15 by wired communication. Also, the communication control section 14 receives the information transmitted by wired communication through the connection port 15, and feeds the received information to the detection section 13.

In addition to controlling wired communication, the communication control section 14 can control wireless communication. In this case, the communication control section 14 can transmit wirelessly the information destined for the battery device 20 and others, receive wirelessly transmitted information, and supply the received information to the detection section 13.

The connection port 15 is a terminal that connects with the cable 30 for wired communication. Wired communication with the power supply function-equipped electronic apparatus 10 is conducted through the connection port 15.

And wired communication carried out through the connection port 15 is compatible with bus-powered operation. Thus the power supply function-equipped electronic apparatus 10 can supply power (electricity) to the battery device 20 through the connection port 15 that connects the battery device 20 via the cable 30 to the electronic apparatus 10.

Besides the above-mentioned USB, the wired communication systems are compatible with bus-power operation including, for example, IEEE (Institute of Electrical and Electronics Engineers) 1394 and the like. And in addition to standardized communication methods such as USB, the wired communication systems compatible with bus-powered operation may include proprietary communication systems.

Furthermore, if the communication control section 14 has means to communicate with the battery device 20 wirelessly or otherwise, the battery device 20 need not be powered simultaneously during communication through the connection port 15; the battery device 20 may be supplied with power independently through the connection port 15.

However, the supply of power through the connection port 15 can be performed when the power supply function-equipped electronic apparatus 10 remains turned on, i.e., when the respective blocks of the power supply function-equipped electronic apparatus 10 are being powered by the power section 11. Power cannot be supplied when the power supply function-equipped electronic apparatus 10 is turned off.

Also, the connection port 15 may be configured to connect either with a single cable 30 or with a plurality of cables.

Illustratively, the battery device 20 may be a controller for use with a gaming machine, a digital still camera, a digital video camera, or any other device that can be driven by the power supplied from the battery 21.

Specifically, the battery device 20 contains the battery 21, a communication control section 22, and a connection port 23 and the like.

The battery 21 supplies power to drive the respective blocks making up the battery device 20, the power being fed to the necessary blocks.

Furthermore, the battery 21 may be configured to be either attached removably to the battery device 20 or built in the battery device 20.

The communication control section 22 controls wired communication carried out via the connection port 23.

Specifically, the communication control section 22 transmits information such as that indicative of the charging status of the battery 21 to the power supply function-equipped electronic apparatus 10 and others, the information being sent by wired communication through the connection port 23. Also, the communication control section 22 receives through the connection port 23 the information that has been transmitted by wired communication.

As with the communication control section 14, besides controlling wired communication, the communication control section 22 can control wireless communication. In this case, the communication control section 22 transmits wirelessly the information destined for the power supply function-equipped electronic apparatus 10 and others. The communication control section 22 can also receive wirelessly transmitted information.

The connection port 23 is a terminal that connects with the cable 30 for wired communication. Wired communication with the battery device 20 is carried out through the connection port 23.

The wired communication carried out through the connection port 23 is compatible with bus-powered operation. Thus the battery device 20 can be supplied with power by the power supply function-equipped electronic apparatus 10 through the connection port 23 that connects the battery device 20 to the electronic apparatus 10 via the cable 30.

In the battery device 20, the power from the power supply function-equipped electronic apparatus 10 is fed to the battery 21 through the connection port 23. In this manner, the battery 21 can be charged with the power coming from the power supply function-equipped electronic apparatus 10.

In order to charge the battery 21 of the battery device 20 in the charging system structured as described above, the user connects the connection port 15 of the power supply function-equipped electronic apparatus 10 with the connection port 23 of the battery device 20 by means of the cable 30.

As discussed above, wired communication conducted through the connection ports 15 and 23 is compatible with bus-powered operation. When the connection ports 15 and 23 are connected using the cable 30, the power supply function-equipped electronic apparatus 10 supplies power to the battery device 20 via the connection port 15 and cable 30.

In the battery device 20, the power from the power supply function-equipped electronic apparatus 10 is supplied to the battery 21 through the connection port 23. The power thus supplied charges the battery 21.

As mentioned above, the connection port 15 of the power supply function-equipped electronic apparatus 10 may be configured to accommodate a plurality of cables. In this case, the connection port 15 may be connected not only to the battery device 20 through the cable 30 but also to other battery devices using other cables. That is, a plurality of battery devices may be connected and the batteries the plurality of battery devices respectively incorporate may be charged.

Explained next in reference to the flowchart of FIG. 2 is the processing performed by the battery device 20 when the battery 21 in the battery device 20 shown in FIG. 1 is charged.

For example, the connection port 15 of the power supply function-equipped electronic apparatus 10 is connected with the connection port 23 of the battery device 20 using the cable 30. When the power supply function-equipped electronic apparatus 10 being turned on supplies power to the battery device 20 via the connection port 15 and cable 30, the supplied power is fed to the battery 21 through the connection port 23 of the battery device 20 and the battery 21 starts being charged.

When the battery 21 in the battery device 20 starts getting charged, in step S11, the communication control section 21 detects the charged level of the battery 21 (charging status). Control is then passed on to step S12.

In step S12, the communication control section 22 transmits charging information indicating the charging status detected in step S11 to the power supply function-equipped electronic apparatus 10 illustratively by wired communication through the connection port 23 and cable 30. Control is then passed on to step S13.

In step S13, the communication control section 22 determines whether charging of the battery 21 is complete on the basis of the charging status detected in the preceding step S11. Specifically, it is determined whether the battery 21 is fully charged.

If in step S13 charging of the battery 21 is not detected to be complete, control is returned to step S11 and the subsequent steps are repeated.

If in step S13 charging of the battery 21 is detected to be complete, then the processing is brought to an end.

In FIG. 2, the communication control section 22 was shown to transmit the charging information indicating the charging status of the battery 21 by wired communication. Alternatively, the charging information indicative of the charging status of the battery 21 may be transmitted by wireless communication.

Also, detection of the charging status in step S11 and transmission of the charging information in step S12 may be performed either by the battery device 20 periodically or irregularly, or by the power supply function-equipped electronic apparatus 10 by wired or wireless communication upon request for charging information.

Figure 3:
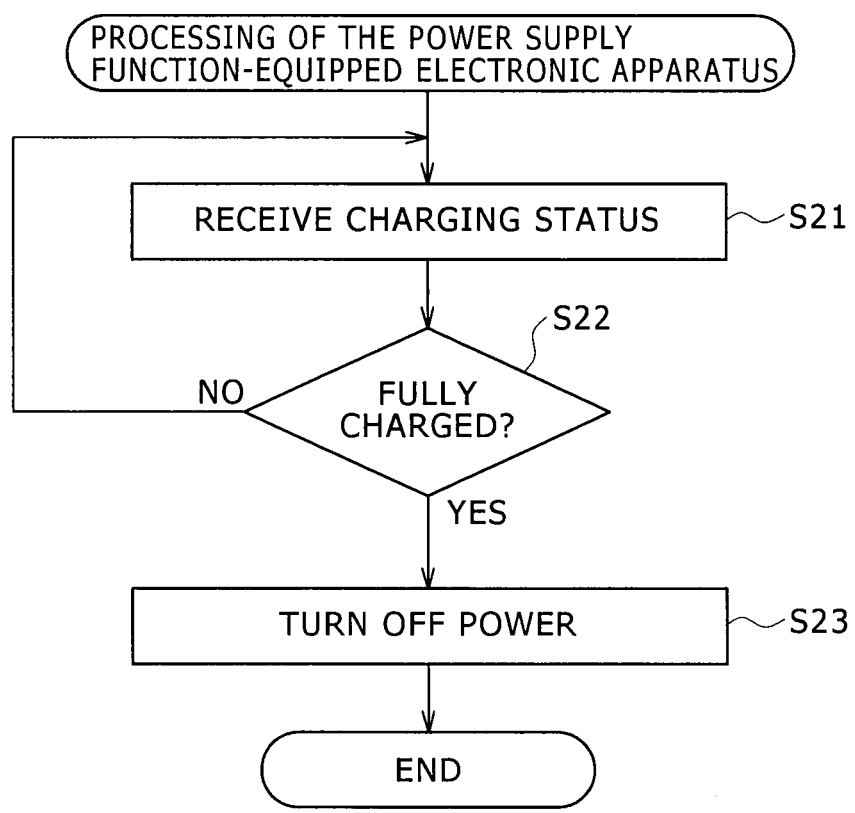
FIG. 3 is a flowchart explanatory of the processing of a power supply function-equipped electronic apparatus 10.

Explained next in reference to the flowchart of FIG. 3 is the processing performed by the power supply function-equipped electronic apparatus 10 when the battery 21 of the battery device 20 in FIG. 1 is charged.

For example, when the connection port 15 of the power supply function-equipped electronic apparatus 10 is connected with the connection port of the battery device 20 by means of the cable 30, the power supply function-equipped electronic apparatus 10 being turned on starts supplying power to the battery device 20 through the connection port 15 and cable 30.

And in step S21, the communication control section 14 waits for the charging information indicating the charging status of the battery 21 to be transmitted from the battery device 20, and receives the charging information thus transmitted.

Here, if the battery device 20 has transmitted the charging information by wired communication through the cable 30, the communication control section 14 receives the charging information thus transmitted through the communication port 15. Also, if the battery device 20 has transmitted the charging information by wireless communication, the communication control section 14 receives the charging information thus transmitted.

Meanwhile, the communication control section 14 may transmit a request for the charging information by wired communication or wireless communication to the battery device 20 so as to receive the charging information from the battery device 20 in response to the request. Alternatively, the communication control section 14 may receive the charging information transmitted from the battery device 20 regardless of such a request.

Upon receipt of the charging information, the communication control section 14 feeds the received charging information to the detection section 13. Control is then passed from step S21 to step S22.

In step S22, the detection section 13 determines (detects) whether charging of the battery 21 incorporated in the battery device 20 is complete by referring to the charging information from the communication control section 14.

If in step S22 charging of the battery 21 is not detected to be complete, then control is returned to step S21 and the subsequent steps are repeated.

If in step S22 charging of the battery 21 is determined to be complete, i.e., if the detection section 13 detects that charging of the battery 21 is complete, then the detection section 13 supplies the power control section 12 with charging complete information, and control is passed on to step S23.

In step S23, the power control section 12 turns off the power supply function-equipped electronic apparatus 10 by controlling the power section 11 in accordance with the charging complete information coming from the detection section 13. That is, the power control section 12 illustratively stops feeding power to the blocks except for those performing a minimum of processing such as handling of the operations on the power button, not shown. The processing is then terminated.

As described above, the power supply function-equipped electronic apparatus 10 detects whether charging of the battery 21 incorporated in the battery device 20 is complete through the cable 30. When charging of the battery 21 is detected to be complete, the power supply function-equipped electronic apparatus 10 is turned off. It follows that even if the user does not turn off power supply function-equipped electronic apparatus 10 following completion of the charging of the battery 21, the power supply function-equipped electronic apparatus 10 is not left switched on to continue wasting power. Wasteful power consumption is thus reduced.

Figure 4:
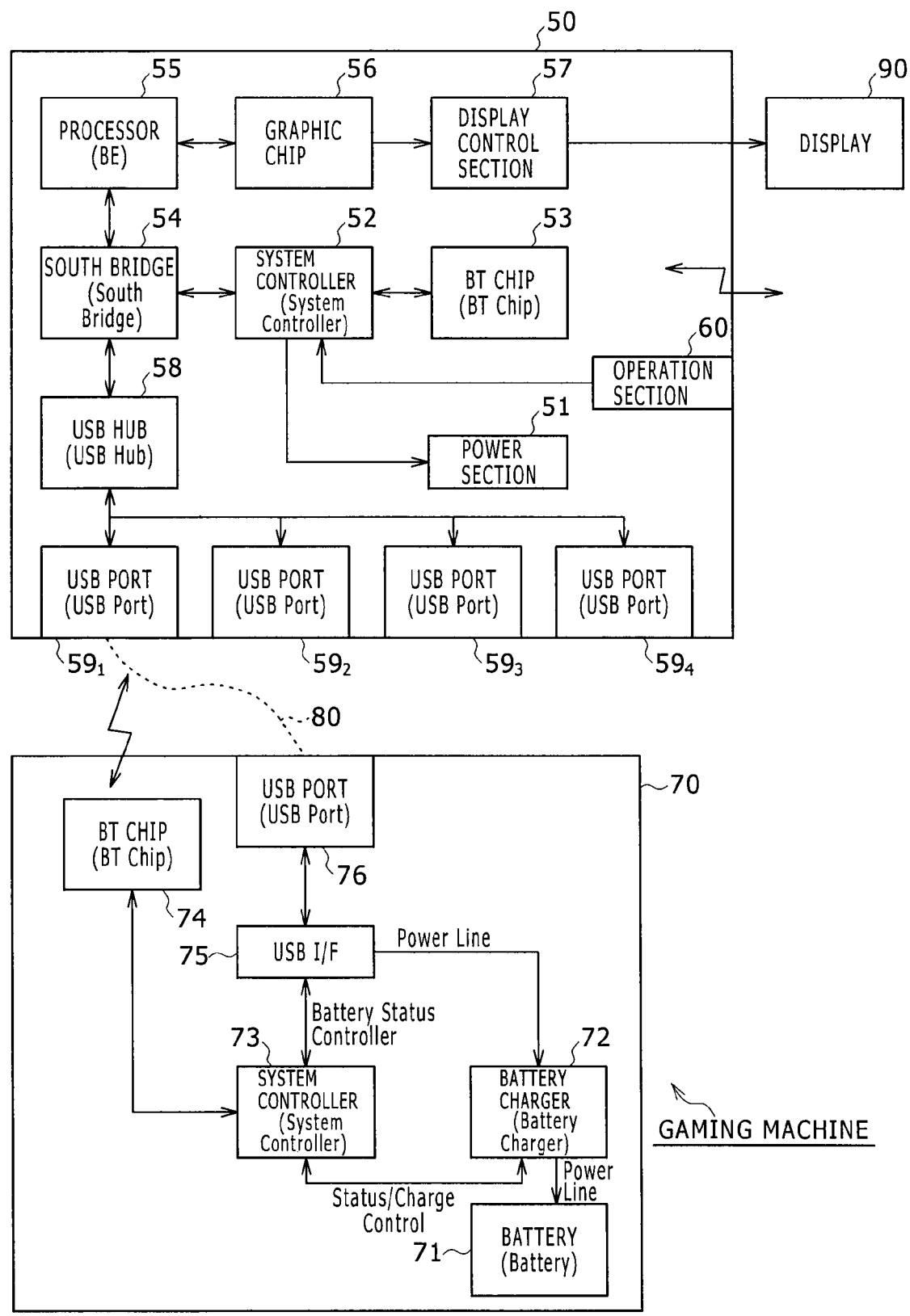
FIG. 4 is a block diagram showing a typical structure of a gaming machine to which the present invention is applied.

FIG. 4 shows a typical structure of a gaming machine to which the charging system of FIG. 1 is applied.

In FIG. 4, the gaming machine is made up of a gaming machine body 50 and a controller 70 for use with the gaming machine. The gaming machine body 50 is connected to the controller 70 either by wired communication illustratively through a USB cable 80, or by wireless communication based on Bluetooth (R) (referred to as BT communication hereunder where appropriate).

The gaming machine body 50 corresponds to the power supply function-equipped electronic apparatus in FIG. 1.

The gaming machine body 50 may be connected to a display 90 displaying pictures. And the gaming machine body 50 receives operation signals reflecting the operations on the controller 70 by BT communication, and supplies pictures such as game screens and menu screens to the display 90 for display thereon.

The gaming machine body 50 can be connected in wired fashion to the controller 70 through the USB cable 80. When the gaming machine body 50 supplies power to the controller 70 via the cable 80, a battery 71 incorporated in the controller 70 is charged.

Specifically, the gaming machine body 50 includes a power section 51, a system controller 52, a BT chip 53, a south bridge 54, a processor 55, a graphic chip 56, a display control section 57, a USB hub 58; USB ports $59_1$, $59_2$, $59_3$ and $59_4$; and an operation section 60 and the like.

The power section 51 converts AC power from a wall outlet not shown into power for driving the respective blocks of the gaming machine body 50. Under control of the system controller 52, the power section 51 supplies the converted power to the necessary blocks.

The system controller 52, for example, contains a processor (CPU (Central Processing Unit)) and a memory. The processor executes programs to control the respective blocks constituting the gaming machine body 50 For example, in response to the operation signals coming from the operation section 60, the system controller 52 controls the power section 51 to turn on or off the gaming machine body 50. Specifically, the system controller 52 controls the power section 51 to control the supply of power to the respective blocks of the gaming machine body 50.

The BT chip 53 performs BT communication as wireless communication under control of the system controller 52. Specifically, the BT chip 53 transmits by BT communication the information coming from the system controller 52, receives the information transmitted by BT communication, and supplies the received information to the system controller 52.

The south bridge 54 functions as an I/F (Interface) between the system controller 52 and the processor 55. Also, the south bridge 54 has the capabilities to function as a host for USB communication, controlling USB communication as wired communication conducted through the USB hub 58, USB ports $59i$, and USB cable 80.

The processor 55 illustratively executes game programs recorded on a disk (not shown) loaded into the gaming machine body 50, controlling the graphic chip 56 to create game screens and other pictures. Here, for use as the processor 55 for executing game programs, it is possible to adopt Cell (Cell Broadband Engine) (Cell Broadband Engine is registered trademark) discussed in the article "Birth of Cell" in Nikkei Electronics published by Nikkei Business Publications, Inc., on Feb. 28, 2005, pp. 89 to 117.

The graphic chip 56 creates game screens and other pictures (i.e., graphics) under control of the processor 55, and feeds the created pictures to the display control section 57.

The display control section 57 forwards the pictures coming from the graphic chip 56 to the display 90 for display thereon, the display 90 being connected to the gaming machine body 50.

The USB hub 58 permits a so-called star connection between the south bridge 54 acting as a host for USB communication on the one hand, and a plurality of USB devices on the other hand. In FIG. 4, the USB hub 58 is shown connected to four USB ports $59_1$ through $59_4$ providing connection with up to four USB devices.

The USB ports $59i$ (i=1, 2, 3, 4) are terminals to which to connect the USB cables 80 for USB communication as wired communication. USB communication with the controller 70 is conducted through the USB ports $59i$.

As discussed above, USB communication is compatible with bus-powered operation. That means the USB devices connected to the USB ports $59i$ via the USB cables 80 can be supplied with power (electricity) by the gaming machine body 50 through the USB ports $59i$.

The operation section 60 is furnished with buttons including a power button and the like which are operated by the user. When operations are performed on its buttons such as the power button, the operation section 60 supplies the system controller 52 with operation signals representing the operations.

Here, the operation section 60 is furnished illustratively with two power buttons: a primary power button and a secondary power button. When an operation is performed to turn off the primary power button, the supply of power to all blocks constituting the gaming machine body 50 is stopped. This puts the gaming machine body 50 in a complete off-state in which no buttons can be operated except for the primary power button.

Carrying out an operation to turn on the primary power button in the complete off-state brings about a normal off-state (so-called sleep state or suspended state) in which power is supplied only to the blocks performing a minimum of processing such as handling of the operations on the secondary power button, i.e., only to the system controller 50 and BT chip 53 in FIG. 4, with the supply of power stopped to all other blocks.

Performing an operation to turn on the secondary power button in the normal off-state brings about an on-state in which the respective blocks of the gaming machine body 50 are supplied with power.

The off-state in this description signifies the normal off-state unless otherwise specified.

In the normal off-state, as described above, the system controller 52 and BT chip 53 are supplied with power. That means the gaming machine body 50 can perform BT communication in the normal off-state. For example, if the controller 70 is operated to transmit by BT communication an operation signal for turning on power, the BT chip 53 can receive that operation signal. In this case, the BT chip 53 forwards the operation signal coming from the controller 70 to the system controller 52. In turn, in keeping with the operation signal, the system controller 52 controls the power section 51 to put the gaming machine body 50 in the on-state.

Here, the supply of power through the USB ports $59i$ is available only when the gaming machine body 50 is in the on-state. In the normal off-state of the gaming machine body 50, not to mention its complete off-state, power is not supplied to the south bridge 54 acting as the USB host. That means the supply of power through the USB ports $59i$ is not available in these states.

If the south bridge 54 is also supplied with power in addition to the system controller 52 and BT chip 53 in the normal off-state, the supply of power through the USB port $59i$ is made possible in the normal off-state as well. In this case, however, the power consumed by the gaming machine body 50 in the normal off-state increases.

The controller 70 corresponds to the battery device 20 in FIG. 1.

The controller 70 incorporates the battery 71 and is driven by the power supplied thereby. And the controller 70 transmits operation signals reflecting the user's operations to the gaming machine body 50 by BT communication. The user can thus manipulate characters and other entities appearing in games by operating the controller 70.

Also, the controller 70 functions as a USB device (target). The controller 70 can thus be connected to the gaming machine body 50 by wired communication through the USB cable 80.

And if the controller 70 is connected to the gaming machine body 50 by wired communication through the USB cable 80, the controller 70 is supplied power by the gaming machine body 50 by having it bus-powered from USB so that the battery 71 inside may be charged.

Specifically, the controller 70 includes the battery 71, a battery charger 72, a system controller 73, a BT chip 74, a USB interface (I/F) 75, and a USB port 76 and the like.

The battery 71 supplies power for driving the respective blocks constituting the controller 70, the power being fed to the necessary blocks.

The battery 71 may be configured either to be attached removably to the controller 70 or to be built therein.

The battery charger 72 charges the battery 71 under control of the system controller 73.

Specifically, the battery charger 72 charges the battery 71 by having it bus-powered from USB using the power supplied from the gaming machine body 50 through the USB cable 80, USB port 76, and USB interface 75.

Also, the battery charger 72 monitors the charging status of the battery 71 and, under control of the system controller 73, feeds charging information (status) indicating the charging status of the battery 71 to the system controller 73.

The system controller 73 controls the battery charger 72, BT chip 74, USB interface 75, etc.

The BT chip 74 conducts BT communication as wireless communication under control of the system controller 73. Specifically, the BT chip 74 transmits by BT communication the information supplied from the system controller 73, receives the information transmitted by BT communication, and feeds the received information to the system controller 73.

Here, BT communication takes place between the gaming machine body 50 and the controller 70, and more specifically between the BT chip 53 and the BT chip 74.

The USB interface 75 functions as a target for USB communication, controlling USB communication as wired communication performed through the USB port 76 and USB cable 80.

Specifically, the USB interface 75 transmits the information bound for the gaming machine body 50 and others by USB communication through the USB port 76 and USB cable 80. Also, the USB interface 75 receives the information transmitted by USB communication through the USB cable 80 and USB port 76 and supplies the received information to the system controller 73.

Meanwhile, the USB interface 75 is bus-powered by USB communication. When thus bus-powered, the USB interface 75 in turn supplies power to the battery charger 72. Using the power thus supplied, the battery charger 72 charges the battery 71 as mentioned above.

The USB port 76 is a terminal to which to connect the USB cable 80 for USB communication as wired communication. The USB port 76 is connected to the USB interface 75. USB communication with the gaming machine body 50 is performed through the USB port 76.

When the gaming machine body 50 structured as described above is in the on-state, operations performed on the controller 70 cause the BT chip 74 in the controller 70 to transmit operation signals reflecting the operations by BT communication.

The operation signals transmitted by BT communication from the BT chip 74 in the controller 70 are received by the BT chip 53 in the gaming machine body 50. The received signals are fed to the system controller 52.

In keeping with the operation signals from the BT chip 53, the system controller 52 controls the processor 55 by way of the south bridge 54. In turn, under control of the system controller 52, the processor 55 controls the graphic chip 56.

Under control of the processor 55, the graphic chip 56 crates pictures such as game screens and feeds the created pictures to the display control section 57. The display control section 57 forwards the pictures coming from the graphic chip 56 to the display 90. This causes the display 90 to display the game screens and other pictures corresponding to the operations performed on the controller 70.

When charging the battery 71 incorporated in the controller 70, the user connects one of the four USB ports $59_1$ through $59_4$ of the gaming machine body 50, for example, USB port $59_1$, to the USB port 76 of the controller 70 with the USB cable 80.

When the gaming machine body 50 is in the on-state, the USB port 76 of the controller 70 is bus-powered by the south bridge 54 of the gaming machine body 50 through the USB hub 58, USB port $59_1$, and USB cable 80.

In the controller 70, the power fed through the USB port 76 is supplied to the battery charger 72 via the USB interface 75. Using the power thus supplied, the battery charger 72 charges the battery 71.

Also, the battery charger 72 monitors the charging status of the battery 71 and feeds the charging information representing the charging status to the system controller 73.

The system controller 73 forwards the charging information coming from the battery charger 72 to one or both of the BT chip 74 and the USB interface 75.

If the system controller 73 forwards the charging information coming from the battery charger 72 to the BT chip 74, the BT chip 74 transmits the charging information by BT communication. The charging information transmitted from the BT chip 74 by BT communication is received by the BT chip 53 of the gaming machine body 50 and fed to the system controller 52.

On the other hand, if the system controller 73 forwards the charging information coming from the battery charger 72 to the USB interface 75, the USB interface 75 transmits the charging information by USB communication. The charging information transmitted from the USB interface 75 by USB communication is received by the south bridge 54 through the USB port 76 and USB cable 80 as well as through the USB port $59_1$ and USB hub 58 of the gaming machine body 50, and is supplied to the system controller 52.

As described above, the system controller 52 detects (determines) whether charging of the battery 71 is complete on the basis of the charging information supplied by BT communication or by USB communication. And upon detecting that charging of the battery 71 is complete, the system controller 52 controls the power section 51 to put (the power of) the gaming machine body 50 in the off-state.

Meanwhile, since the gaming machine body 50 in FIG. 4 has four USB ports $59_1$ through $59_4$, it can charge not one controller 70 but a plurality of controllers (their batteries) simultaneously.

Explained hereunder in reference to FIG. 5 is the processing performed by the gaming machine body 50 when a plurality of controllers including the controller 70 are charged simultaneously.

The configuration shown at the top of FIG. 5 is a case where the gaming machine body 50 simultaneously charges a total of four controllers having the controller 70 and of controllers $70_1$, $70_2$ and $70_3$ having the same structure as that of the controller 70.

The controllers 70, $70_1$, $70_2$ and $70_3$ are connected respectively to the four USB ports $59_1$, $59_2$, $59_3$ and $59_4$ of the gaming machine body 50, and are bus-powered thereby for charging.

And each of the controllers 70, $70_1$, $70_2$ and $70_3$ transmits charging information to the gaming machine body 50 illustratively by USB communication.

When the gaming machine body 50 detects that charging of all or a particular one(s) of the controllers 70, $70_1$, $70_2$ and $70_3$ is complete on the basis of the charging information coming from the controllers 70, $70_1$, $70_2$ and $70_3$, the gaming machine body 50 enters the off-state.

The configuration second from the top in FIG. 5 is a case similar to that of the top configuration in FIG. 5, in which the gaming machine body 50 simultaneously charges a total of four controllers having the controller 70 and of the controllers 70₁, 70₂ and 70₃.

As in the top configuration in FIG. 5, each of the controllers 70, 70₁, 70₂ and 70₃ is bus-powered for charging by the gaming machine body 50. In turn, these controllers transmit their charging information to the gaming machine body 50.

It should be noted that in the configuration second from the top in FIG. 5, each of the controllers 70, 70₁, 70₂ and 70₃ transmits the charging information to the gaming machine body 50 not by USB communication but by BT communication.

And when the gaming machine body 50 detects that charging of all or a particular one(s) of the controllers 70, 70₁, 70₂ and 70₃ is complete on the basis of the charging information coming from the controllers 70, 70₁, 70₂ and 70₃, the gaming machine body 50 enters the off-state.

The configuration third from the top in FIG. 5 (first from the bottom) is a case where there are more controllers to be charged than the four that can be connected in wired fashion to the gaming machine body 50.

Specifically, in the configuration third from the top in FIG. 5, there is a controller 70₄ which is targeted to be charged and which has the same structure as the controller 70, in addition to the controllers 70, 70₁, 70₂ and 70₃.

In the configuration third from the top in FIG. 5, the controllers 70, 70₁, 70₂ and 70₃ are connected respectively to the four USB ports 59₁, 59₂, 59₃ and 59₄ of the gaming machine body 50, and are bus-powered for charging.

In this case, the controller 70₄ cannot be connected in wired fashion to the gaming machine body 50. Thus in the configuration third from the top in FIG. 5, the controller 70₄ is connected via a USB cable to an electronic apparatus such as a PC which, besides the gaming machine body 50, functions as a USB host. The controller 70₄ is then bus-powered for charging by the PC.

Furthermore, in the configuration third from the top in FIG. 5, each of the controllers 70, 70₁, 70₂ and 70₃ connected in wired fashion to the gaming machine body 50 transmits the charging information by USB communication to the gaming machine body 50. On the other hand, the controller 70₄ wired not to the gaming machine body 50 but to the PC transmits the charging information by BT communication to the gaming machine body 50.

When the gaming machine body 50 detects that charging of all or a particular one(s) of the controllers 70, 70₁, 70₂, 70₃ and 70₄ is complete on the basis of the charging information coming from the controllers 70, 70₁, 70₂, 70₃ and 70₄, the gaming machine body 50 enters the off-state.

In the manner described above, the gaming machine body 50 can charge a plurality of controllers simultaneously.

Next, as explained in reference to FIG. 5, the gaming machine body 50 may be triggered to enter the off-state either upon detecting that charging of all of the multiple controllers is complete, or upon detecting that charging of a particular one(s) of the multiple controllers is complete.

Illustratively, the user can specify on a menu screen or the like that the gaming machine body 50 is to be triggered to enter the off-state either upon detecting that charging of all of the multiple controllers is complete or upon detecting that charging of a particular one(s) of the multiple controllers is complete.

Specifically, FIG. 6 shows a typical menu screen displayed illustratively when power of the gaming machine body 50 is to be turned off.

The menu screen of FIG. 6 is displayed illustratively when the user presses a particular button continuously on the controller 70.

Specifically, when the user presses the particular button continuously on the controller 70 (FIG. 4), an operation signal (continuous pressing operation signal) reflecting the continuous pressing operation is fed from the system controller 73 to the BT chip 74. The BT chip 74 transmits by BT communication the continuous pressing operation signal coming from the system controller 73. The continuous pressing operation signal is received by the BT chip 53 of the gaming machine body 50 (FIG. 4) and forwarded to the system controller 52.

When supplied with the continuous pressing operation signal from the BT chip 53, the system controller 52 controls the processor 55 and also the graphic chip 56 via the sough bridge 54 so as to create the menu screen in accordance with the continuous pressing operation signal, the created menu screen being fed to the display control section 57. The display control section 57 feeds the menu screen coming from the graphic chip 56 to the display 90. This causes the display 90 to display the menu screen.

The screen shown at the top of FIG. 6 is a menu screen displayed when the particular button is pressed continuously on the controller 70.

The menu screen at the top of FIG. 6 displays four items: "Turn off power of the machine proper," "Turn off power of this controller," "Turn off power when charging of this controller is complete," and "Turn off power when charging of all controllers is complete."

By operating the controller 70, the user can select one of the four items: "Turn off power of the machine body," "Turn off power of this controller," "Turn off power when charging of this controller is complete," or "Turn off power when charging of all controllers is complete."

If the item "Turn off power of the machine body" is selected on the menu screen, the gaming machine body 50 immediately enters the off-state. If the item "Turn off power of this controller" is selected, then the gaming machine body 50 controls illustratively by BT communication the controller 70 having been operated to display the menu screen, in such a manner that the controller 70 is turned off. This puts the controller 70 in the off-state (the supply of power from the battery 71 is stopped).

Furthermore, if the item "Turn off power when charging of this controller is complete" is selected, the gaming machine body 50 detects whether charging of the controller 70 is complete on the basis of the charging information transmitted by the controller 70 having been operated to display the menu screen. When charging of the controller 70 is detected to be complete, the gaming machine body 50 enters the off-sate.

Also, if the item "Turn off power when charging of all controllers is complete" is selected, the gaming machine body 50 detects whether charging of all controllers including the controller 70 having been operated to display the menu screen is complete on the basis of the charging information transmitted by all controllers. When charging of all controllers is detected to be complete, the gaming machine body 50 enters the off-state.

The screen in the bottom left of FIG. 6 is a first charging screen that appears on the display 90 in place of the menu screen at the top of FIG. 6, when the item "Turn off power when charging of all controllers is complete" has been selected on the menu screen so that the controllers transmitting the charging information are currently charged.

Specifically, the screen in the bottom left of FIG. 6 constitutes the first charging screen in effect when all controllers transmitting the charging information have four controllers #1, #2, #3 and #4.

The first charging screen displays the charging status of each of the four controllers #1, #2, #3 and #4 transmitting the charging information, i.e., the four controllers #1, #2, #3 and #4 targeted to be charged.

On the first charging screen in the bottom left of FIG. 6 appears a message saying that the controller #1 is being charged up to 75%. Also displayed are a message saying that the controller #2 has been fully charged (charged up to 100%), a message saying that the controller #3 is being charged up to 40%, and a message saying that the controller #4 is being charged up to 20%.

The screen in the bottom right of FIG. 6 is a second charging screen that appears on the display 90 in place of the menu screen at the top of FIG. 6, when the item "Turn off power when charging of this controller is complete" has been selected on the menu screen so that the controller transmitting the charging information is currently charged.

Specifically, the screen in the bottom right of FIG. 6 constitutes the second charging screen in effect when the controller #1 has been operated to display the menu screen.

The second charging screen displays the charging status of only the controller #1 having been operated to display the menu screen.

On the second charging screen in the bottom right of FIG. 6 appears a message saying that the controller #1 having been operated to display the menu screen is being charged up to 75%.

By viewing the first and the second charging screens, the user can recognize the charging status.

On the basis of the charging information transmitted by the controllers targeted to be charged, the system controller 52 controls the graphic chip 56 via the south bridge 54 and the processor 55 so as to create the first and the second charging screens. The created screens are displayed on the display 90 by way of the display control section 57.

Figure 7:
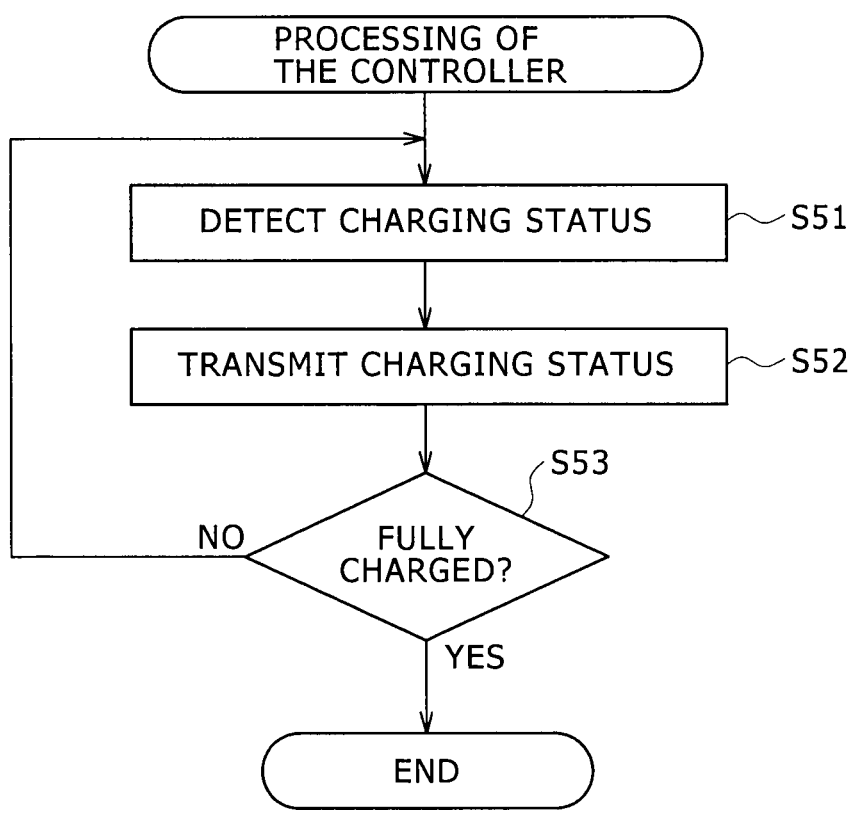
FIG. 7 is a flowchart explanatory of the processing of a controller 70.

Explained next in reference to the flowchart of FIG. 7 is the processing performed by the controller 70 when the battery 71 of the controller 70 shown in FIG. 4 is charged.

Illustratively, when the user operates the controller 70, the display 90 displays the menu screen shown in FIG. 6. Furthermore, when the item "Turn off power when charging of this controller is complete" or the item "Turn off power charging of all controllers is complete" is selected on the menu screen, having (or keeping) one of the USB port 59i (59$_1$ through 59$_4$) of the gaming machine body 50 connected to the USB port 76 of the controller 70 using the USB cable 80 causes the south bridge 54 of the currently activated gaming machine body 50 to supply power to the battery charger 72 via the USB hub 58, USB port 59, USB cable 80, the USB port 59i of the controller 70, and USB interface 75. In turn, the battery charger 72 of the controller 70 starts charging the battery 71.

Having started to charge the battery 71, the battery charger 72 starts detecting (monitoring) the charging status of the battery 71.

And in step S51, the system controller 73 requests the charging status of the battery 71 from the battery charger 72 and receives a response to that request from the battery charger 72, thus detecting the charging status of the battery 71. Control is then passed on to step S52.

In step S52, the system controller 73 transmits the charging information detected in step S51 to the gaming machine body 50 illustratively by USB communication through the USB interface 75, USB port 59i, and USB cable 80. Control is then passed on to step S53.

In step S53, the system controller 73 determines whether charging of the battery 71 is complete, i.e., whether the battery 71 is fully charged, on the basis of the charging status detected in the preceding step S51.

If in step S53 charging of the battery 71 is not determined to be complete, control is returned to step S51. The subsequent steps are then repeated.

And if in step S53 charging of the battery 71 is determined to be complete, the processing is terminated.

Whereas FIG. 7 shows that the controller 70 transmits the charging information about the battery 71 by USB communication as wired communication, the charging information about the battery 71 may alternatively be transmitted illustratively by the BT chip 74 by BT communication as wireless communication.

Also, detection of the charging status in step S51 and transmission of the charging information in step S52 may be carried out either by the controller 70 itself periodically or irregularly, or by the gaming machine body 50 by USB communication or BT communication upon request for charging information.

Figure 8:
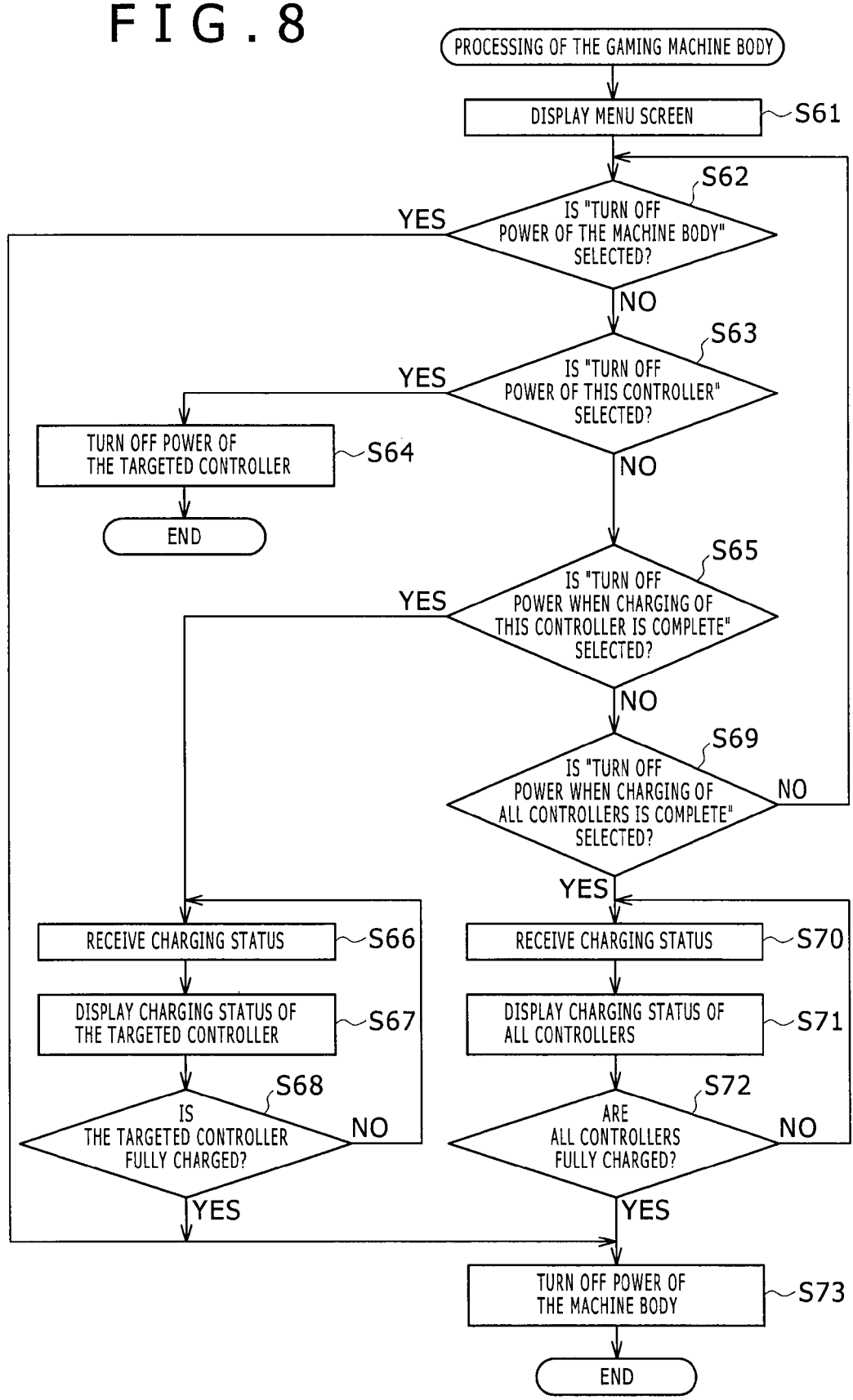
FIG. 8 is a flowchart explanatory of the processing of the gaming machine body 50.

Explained next in reference to the flowchart of FIG. 8 is the processing performed by the gaming machine body 50 when the battery 71 of the controller 70 in FIG. 4 is charged.

For example, when the user operates the controller 70 to display the menu screen, an operation signal reflecting that operation (i.e., the above-mentioned continuous pressing operation signal) is transmitted from the BT chip 74 by BT communication.

And the BT chip 53 of the gaming machine body 50 receives the continuous pressing operation signal coming from the BT chip 74 of the controller 70 and forwards the received signal to the system controller 52. In turn, the system controller 52 in step S61 controls the processor 55 and also the graphic chip 56 via the sough bridge 54 in accordance with the continuous pressing operation signal, so as to create the menu screen shown at the top of FIG. 6. The menu screen is fed from the graphic chip 56 through the display control section 57 to the display 90 for display thereon.

After the menu screen is displayed in step S61, control is passed on to step S62. In step S62, the system controller 52 determines whether the item "Turn off power of the machine body" is selected on the menu screen.

If in step S62 the item "Turn off power of the machine body" is determined to be selected, i.e., if the user operates the controller 70 to select the item "Turn off power of the machine body," so that the operation signal reflecting the operation is transmitted from the BT chip 74 by BT communication and received by the BT chip 53 of the gaming machine body 50 before being fed to the system controller 52, then control is passed on to step S73. In step S73, the system controller 52 controls the power section 51 to put the gaming machine body 50 in the off-state, and the processing is terminated.

If in step S62 the item "Turn off power of the machine body" is not determined to be selected, control is passed on to step S63. In step S63, the system controller 52 determines whether the item "Turn off power of this controller" is selected on the menu screen.

If in step S63 the item "Turn off power of this controller" is determined to be selected, i.e., if the user operates the controller 70 to select the item "Turn off power of this controller," so that the operation signal reflecting the operation is transmitted from the BT chip 74 by BT communication and received by the BT chip 53 of the gaming machine body 50 before being fed to the system controller 52, then control is passed on to step S64. In step S64, the system controller 52 controls the BT chip 53 to transmit by BT communication an instruction signal instructing that the supply of power be turned off, and the processing is terminated.

In the controller 70 operated to display the menu screen, the instruction signal sent from the gaming machine body 50 by BT communication is received by the BT chip 74 and fed to the system controller 73. Given the instruction signal instructing that the supply of power be turned off, the system controller 73 controls the battery 71 via the battery charger 72 to stop the supply of power to all but a minimum of blocks that need power. This turns off power of the controller 70.

If in step S63 the item "Turn off power of this controller" is not determined to be selected, then control is passed on to step S65. In step S65, the system controller 52 determines whether the item "Turn off power when charging of this controller is complete" is selected on the menu screen.

If in step S65 the item "Turn off power when charging of this controller is complete" is determined to be selected, i.e., if the user operates the controller 70 to select the item "Turn off power if charging of this controller is complete," so that the operation signal reflecting the operation is transmitted from the BT chip 74 by BT communication and received by the BT chip 53 of the gaming machine body 50 before being fed to the system controller 52, then control is passed on to step S66 and subsequent steps, and the controller 70 is charged.

Specifically, where the USB port 59*i* of the gaming machine body 50 is not connected to the USB port 76 of the controller 70, using the USB cable 80 to connect the USB port 59*i* to the USB port 76 allows the south bridge 54 of the gaming machine body 50 currently in the on-state to bus-power the controller 70 by USB communication through the USB hub 58, USB port 59*i*, and USB cable 80.

In the controller 71, the power supplied from the gaming machine body 50 is fed to the battery charger 72 through the USB port 76 and USB interface 75. Given the power, the battery charger 72 starts charging the battery 71.

In step S66, the system controller 52 waits for and receives charging information which indicates the charging status of the battery 71 and which is transmitted from the controller 70.

Here, if the controller 70 transmits the charging information by USB communication through the USB cable 80, the system controller 52 receives the charging information transmitted by USB communication through the USB port 59*i*, USB hub 58 and sough bridge 54. And if the controller 70 transmits the charging information by BT communication, the system controller 52 receives via the BT chip 53 the charging information transmitted by BT communication.

The system controller 52 may transmit a request for the charging information to the controller 70 by USB or BT communication and receive the charging information transmitted by the controller 70 as a response to that request. Alternatively, the system controller 52 may receive the charging information transmitted by the controller 70 regardless of such requests.

Upon receipt of the charging information from the controller 70, the system controller 52 goes from step S66 to step S67. In step S67, the system controller 52 causes the display 90 to display the charging status of the controller having been operated to display the menu screen (the controller may be called the target controller hereunder where appropriate), i.e., to display the charging status of the controller 70 in this case.

Specifically, based on the charging information received in the preceding step S66, the system controller 52 controls the processor 55 and also the graphic chip 56 via the south bridge 54 to create the second charging screen shown in the bottom right of FIG. 6, the screen displaying the charging status of the target controller. The second charging screen is supplied from the graphic chip 56 via the display control section 57 to the display 90 for display on the latter.

Later, control is passed from step S67 to step S68. In step S68, the system controller 52 references the charging information from the controller 70 as the target controller in order to determine whether charging of the battery 71 incorporated in the controller 70 is complete.

If in step S68 charging of the battery 71 is not determined to be complete, control is returned to step S66 and the subsequent steps are repeated.

If in step S68 charging of the battery 71 is determined to be complete, i.e., if it is detected that charging of the battery 71 is complete, then control is passed on to step S73.

In step S73, the system controller 52 controls the power section 51 to put the gaming machine body 50 in the off-state. The processing is then terminated.

If in step S65 the item "Turn off power when charging of this controller is complete" is not determined to be selected on the menu screen, then control is passed on to step S69. In step S69, the system controller 52 determines whether the item "Turn off power when charging of all controllers is complete" is selected on the menu screen.

If in step S69 the item "Turn off power when charging of all controllers is complete" is not determined to be selected, then control is returned to step S62, and the subsequent steps are repeated.

If in step S69 the item "Turn off power when charging of all controllers is complete" is determined to be selected, i.e., if the user operates the controller 70 to select the item "Turn off power when charging of all controllers is complete," so that the operation signal reflecting the operation is transmitted from the BT chip 74 by BT communication and received by the BT chip 53 of the gaming machine body 50 before being fed to the system controller 52, then control is passed on to step S70 and subsequent steps. Not only the controller 70 operated to display the menu screen but also all controllers connected to the USB ports 59$_1$ through 59$_4$ of the gaming machine body 50 are charged.

Specifically, the south bridge 54 of the gaming machine body 50 in the on-state enables all controllers connected with the USB ports 59$_1$ through 59$_4$ to be bus-powered by USB communication via the USB hub 58, USB port 59*i*, and USB cable 80.

In the controller 70 targeted to be charged, the power supplied from the gaming machine body 50 is fed to the battery charger 72 via the USB port 76 and USB interface 75. Given the power, the battery charger 72 starts charging the battery 71. The other controllers also targeted to be charged start getting charged as well.

And in step S70, the system controller 52 waits for and receives the charging information from any one of the controllers targeted to be charged including the controller 70.

Here, when the item "Turn off power when charging of all controllers is complete" is selected on the menus screen, as when the item "Turn off power when charging of this controller is complete" was selected as described above, the charging information is transmitted by USB communication or BT communication from the controllers targeted to be charged including the controller 70.

Also, the charging information may be transmitted from the controllers targeted to be charged including the controller 70 either upon request for charging information from the system controller 52 or regardless of such requests.

When the system controller 52 receives the charging information from the controllers targeted to be charged, control is passed from step S70 to step S71. In step S71, the system controller 52 causes the display 90 to display the charging status of all controllers targeted to be charged.

Specifically, based on the latest charging information received in step S70 from each of the controllers targeted to be charged, the system controller 52 controls the processor 55 and also the graphic chip 56 via the south bridge 54 to create the first charging screen shown in the bottom left of FIG. 6, the screen displaying the charging status of all controllers targeted to be charged. The first charging screen is supplied from the graphic chip 56 via the display control section 57 to the display 90 for display on the latter.

Later, control is passed from step S71 to step S72. In step S72, the system controller 52 determines whether charging of all controllers targeted to be charged is complete in reference to the latest charging information about all the target controllers.

If in step S72 charging of all target controllers is not determined to be complete, control is returned to step S70 and the subsequent steps are repeated.

If in step S72 charging of all target controllers is determined to be complete, i.e., if it is detected that charging of all controllers targeted to be charged is complete, then control is passed on to step S73.

In step S73, the system controller 52 controls the power section 51 to turn off power of the gaming machine body 50, and the processing is terminated.

As described above, the gaming machine body 50 that supplies (feeds) power for charging detects whether charging of a particular controller operated to display the menu screen is complete or whether charging of all controllers targeted to be charged is complete. On detecting that charging of the particular controller operated to display the menu screen is complete or that charging of all target controllers is complete, the gaming machine body 50 turns off its own power. Thus after charging of the battery 71 is completed, the user is not required to perform operations to turn off power of the gaming machine body 50; the gaming machine body 50 turns off power by itself to prevent wasteful power consumption which would occur if the gaming machine 50 were left activated.

In addition to USB communication, the embodiment shown in FIG. 4 may illustratively adopt the IEEE 1394 or some other suitable type of communication as wired communication capable of supplying power.

Also, in addition to BT communication, the embodiment shown in FIG. 4 may illustratively adopt wireless LAN (IEEE 802.11) communication or the like as wireless communication.

Next, FIG. 9 shows a typical structure of a computer (PC) to which the present invention is applied.

In the computer, a CPU (Central Processing Unit) 102, a ROM (Read Only Memory) 103, and a RAM (Random Access Memory) 104 are interconnected by a bus 101.

The bus 101 is further connected with an input/output interface 110. The input/output interface 110 is connected to a storage section 105 typically made up of a hard disk and a nonvolatile memory, an output section 106 typically composed of a display and speakers and the like; an input section 107 typically constituted by a keyboard, a mouse and a microphone and the like; a communication section 108 typically formed by interfaces for the USB and IEEE 1394 and the like as well as network interfaces and the like for wired LAN and wireless LANs, and a drive 109 that drives removable recording media 111 including magnetic disks, optical disks, magneto-optical disks, or semiconductor memory.

In the computer structured as described above, the CPU 102 illustratively loads programs from the storage section 105 where they were stored into the RAM 104 for execution by way of the input/output interface 110 and bus 101, whereby the series of steps explained in reference to FIGS. 3 and 8 are carried out.

Specifically, when the battery device 20 (FIG. 1) is connected to the communication section 108 illustratively using the USB cable, the CPU 102 causes the communication section 108 to supply power to the battery device through the USB cable. Also, the CPU 102 detects whether charging of the battery device 20 is complete. On detecting that charging of the battery device 20 is complete, the CPU 102 turns off power of the computer.

For example, the programs executed by the computer (CPU 102) may be offered recorded on the removable recording media 111 constituting package media such as magnetic disks (including flexible disks), optical disks (including CD-ROM (Compact Disc-Read Only Memory) and DVD (Digital Versatile Disc)), magneto-optical disks, or semiconductor memory; or may be offered through wired or wireless communication media such as local area networks, the Internet, and digital satellite broadcasts.

And when the removable recording media 111 are attached to the drive 109, the programs can be installed from the media into the storage section 105 via the input/output interface 110. Also, the programs can be received by the communication section 108 via the wired or wireless transmission media and installed into the storage section 105. Otherwise, the programs may be preinstalled in the ROM 103 or in the storage section 105.

Also, the programs for execution by the computer may be processed in the depicted sequence of this specification on a time series basis, in parallel, or in otherwise appropriately timed fashion such as when they are invoked.

It should be understood that the present invention when embodied is not limited to the above-described embodiments and that various modifications, variations and alternatives may be made of the invention so far as they are within the scope of the appended claims or the equivalents thereof.

The invention claimed is:

1. An electronic apparatus connected to a plurality of devices each incorporating a battery via a corresponding cable in a manner capable of supplying power to each device through said corresponding cable, said electronic apparatus comprising:

detection means for detecting whether charging of the battery incorporated in said device is complete through said cable;

power control means for turning off power of said detection means and said power control means of said electronic apparatus when charging of said battery is detected to be complete; and display control means for causing display means displaying pictures to display a menu screen prompting a user to select whether to turn off said power when charging of the battery incorporated in one particular device out of the plurality of devices is complete, or when charging of the batteries incorporated in all of said plurality of devices is complete, wherein, if said power is selected to be turned off when charging of the battery in said one particular device is complete, then said power control means turns off said power of said detection means and said power control means of said electronic apparatus when charging of the battery in said one particular device is detected to be complete, and wherein, if said power is selected to be turned off when charging of the batteries incorporated in all of said devices is complete, then said power control means turns off said power of said detection means and said power control means of said electronic apparatus when charging of the batteries incorporated in all of said devices is detected to be complete.

2. The electronic apparatus according to claim 1, wherein said power control means turns off said power when charging of the battery incorporated in one particular device out of a plurality of devices is detected to be complete.

3. The electronic apparatus according to claim 1, wherein said power control means turns off said power when charging of the batteries incorporated in all of a plurality of devices is detected to be complete.

4. The electronic apparatus according to claim 1, further comprising: wired communication control means for conducting wired communication with each device via said cable;

wherein said detection means detects whether charging of the battery incorporated in each device is complete on the basis of information indicating status of each device and acquired through said wired communication.

5. The electronic apparatus according to claim 1, further comprising:

wireless communication control means for conducting wireless communication with said device; wherein said detection means detects whether charging of the battery incorporated in said device is complete on the basis of information indicating status of said device and acquired through said wireless communication.

6. A control method for controlling an electronic apparatus connected to a plurality of devices each incorporating a battery via a corresponding cable in a manner capable of supplying power to said device through said cable, said control method comprising detecting whether charging of the battery incorporated in each device is complete through said cable with a detector in the apparatus;

displaying pictures to display a menu screen prompting a user to select whether to turn off said power when charging of the battery incorporated in one particular device out of the plurality of devices is complete, or when charging of the batteries incorporated in all of said plurality of devices is complete;

turning off said power of said detector and a power controller of said electronic apparatus when charging of the battery in said one particular device is detected to be complete if said power is selected to be turned off when charging of the battery in said one particular device is complete; and turning off said power of said detector and the power controller of said electronic apparatus when charging of the batteries incorporated in all of said devices is detected to be complete if said power is selected to be turned off when charging of the batteries incorporated in all of said devices is complete.

7. A non-transitory computer readable medium encoded with a program for causing a computer to function as an electronic apparatus connected to a plurality of devices each incorporating a battery via a corresponding cable in a manner capable of supplying power to each device through said corresponding cable, said program causing said computer to perform a method comprising:

detecting whether charging of the battery incorporated in each device is complete through said cable with a detector in the apparatus;

displaying pictures to display a menu screen prompting a user to select whether to turn off said power when charging of the battery incorporated in one particular device out of the plurality of devices is complete, or when charging of the batteries incorporated in all of said plurality of devices is complete;

turning off said power of said detector and a power controller of said electronic apparatus when charging of the battery in said one particular device is detected to be complete if said power is selected to be turned off when charging of the battery in said one particular device is complete; and turning off said power of said detector and the power controller of said electronic apparatus when charging of the batteries incorporated in all of said devices is detected to be complete if said power is selected to be turned off when charging of the batteries incorporated in all of said devices is complete.

8. An electronic apparatus connected to a plurality of devices each incorporating a battery via a corresponding cable in a manner capable of supplying power to each device through said corresponding cable, said electronic apparatus comprising:

a detector configured to detect whether charging of the battery incorporated in each device is complete through said cable;

a power controller configured to turn off power of said detector and said power controller of said electronic apparatus when charging of said battery is detected to be complete; and a display controller configured to control a display to display a menu screen prompting a user to select whether to turn off said power when charging of the battery incorporated in one particular device out of the plurality of devices is complete, or when charging of the batteries incorporated in all of said plurality of devices is complete.

* * * * *